US005966716A

United States Patent [19]
Comer et al.

[11] Patent Number: 5,966,716
[45] Date of Patent: Oct. 12, 1999

[54] AUTOMATIC SPREADSHEET FORMS

[75] Inventors: Ross W. Comer, Bothell; John R. H. Misko, Seattle; Troy L. Link, Redmond, all of Wash.

[73] Assignee: Microsoft Corporation, Redmond, Wash.

[21] Appl. No.: 09/115,449

[22] Filed: Jul. 14, 1998

Related U.S. Application Data

[62] Division of application No. 08/659,281, Jun. 6, 1996, Pat. No. 5,819,293.

[51] Int. Cl.⁶ .................................................. G06F 17/30
[52] U.S. Cl. ............................ 707/203; 707/1; 707/511
[58] Field of Search ................................. 707/203, 511, 707/1

[56] References Cited

U.S. PATENT DOCUMENTS

| | | | |
|---|---|---|---|
| 5,293,615 | 3/1994 | Amada | 707/4 |
| 5,371,675 | 12/1994 | Greif et al. | 707/503 |
| 5,475,836 | 12/1995 | Harris et al. | 395/681 |
| 5,499,180 | 3/1996 | Ammirato et al. | 707/503 |
| 5,564,044 | 10/1996 | Pratt | 395/676 |

OTHER PUBLICATIONS

Microsoft Works User's Guide Version 1.05, (Microsoft Corporation, Redmond, Washington, 1987,1988), p.xvi–xix, pp. 546–547.
Microsoft Works, User's Guide Version 3, (Microsoft Corporation, Redmond, Washington, 1987–1992), pp. 465–469.

*Primary Examiner*—Paul R. Lintz
*Attorney, Agent, or Firm*—Lee & Hayes, PLLC

[57] ABSTRACT

A method of entering and saving data using a spreadsheet program, includes providing a spreadsheet template that defines a spreadsheet form, and creating multiple instances of the spreadsheet form defined by the spreadsheet template. Each instance of the spreadsheet form has data-entry cells containing variable data. The method includes a step of associating each form instance with a different record of a database, wherein each database record has record fields corresponding respectively to data-entry cells of the form instances. When the user saves a particular form instance as a spreadsheet using the spreadsheet program, instructions associated with the form instance also save the variable data from the data-entry cells in corresponding record fields of an associated database record.

4 Claims, 10 Drawing Sheets

|   | A | B | C |
|---|---|---|---|
| 1 | DATE | 5/1/96 |   |
| 2 | BUSHELS | 300 |   |
| 3 | PRICE/BUSHEL | $3.55 |   |
| 4 |   |   |   |
| 5 | TOTAL PRICE | $1065.00 |   |
| 6 |   |   |   |
| 7 |   |   |   |

DAILY DELIVERY

Fig 3

TEMPLATE WIZARD – STEP 1 OF 5

The template wizard with Data Tracking creates a template and a database from a Microsoft Excel workbook. You select cells in the template and the wizard links them to the database.

Each time you enter data in the template, it will be copied to the database.

Select the name of the workbook you want to create a template from.

Daily Delivery

C:\DELIVERY

| | A | B | C |
|---|---|---|---|
| 1 | CUSTOMER QUOTE TEMPLATE | | |
| 2 | CUSTOMER | | |
| 3 | TERMS (YRS) | MONTHLY | 1 YEAR |
| 4 | BASE | $125 | $125 |
| 5 | DISCOUNT | 42% | 44% |
| 6 | TOTAL | $73 | $70 |

Table: Customer Quote

| Customer | Monthly | 1-year |
|---|---|---|
| Jim | $73 | $70 |
| Jane | $200 | $150 |
| Joe | $125 | $100 |

Record: 67 of 91

Help   Cancel   < Back   Next >   Finish

Fig. 4

|  | KEY | DATE | BUSHELS | TOTAL PRICE |
|---|---|---|---|---|
| INSTANCE 1 | 4132 | 5/1/96 | 300 | 1065.00 |
| INSTANCE 2 | 9430 | 5/2/96 | 540 | 2160.00 |
| INSTANCE 3 | 2393 | 5/3/96 | 2000 | 7900.00 |
| INSTANCE 4 | 2934 | 5/6/96 | 2150 | 9116.00 |
| INSTANCE 5 | 7832 | 5/7/96 | 1580 | 7141.00 |

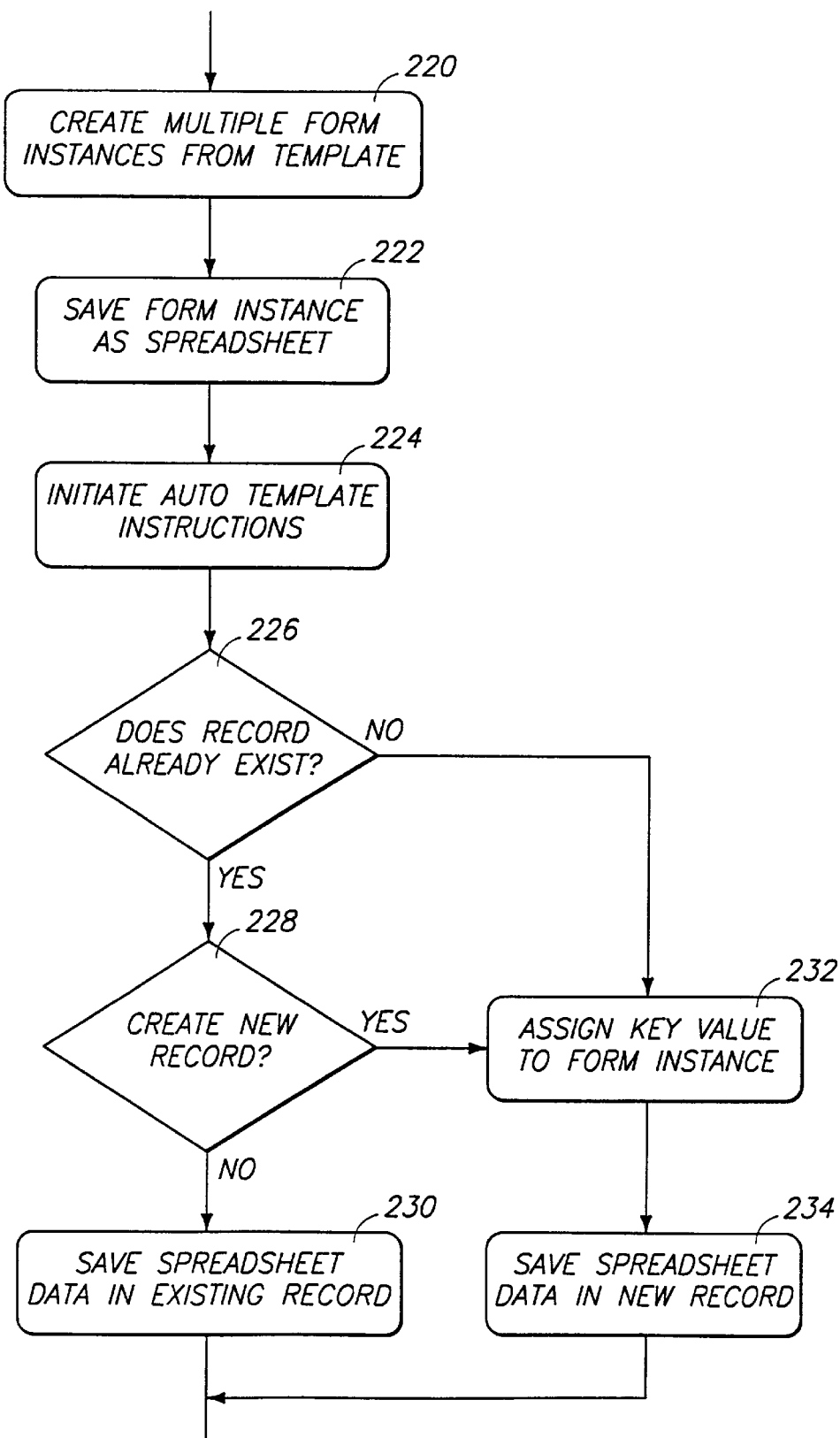

AUTOMATIC SPREADSHEET FORMS

RELATED APPLICATIONS

This is a divisional of U.S. patent application Ser. No. 08/659,281, filed Jun. 6, 1996, which is now U.S. Pat. No. 5,819,293.

TECHNICAL FIELD

This invention relates to computer spreadsheet programs and to templates used within computer spreadsheet programs.

BACKGROUND OF THE INVENTION

A spreadsheet program is a computer application program commonly used for budgets, forecasting, and other finance-related tasks. In a spreadsheet program, data and formulas are entered in ledger-like forms (spreadsheets or worksheets) for analysis, tracking, planning, or "what-if" evaluations of the impacts of real or proposed changes on an economic strategy. Spreadsheet programs use rows and columns of cells; each cell can hold text or numeric data or a formula that uses values in other cells to calculate a desired result. The columns are often organized by letter—Columns A, B, C, etc.—and the rows are organized by number—Rows 1, 2, 3, etc. Each cell is identified by a combination of column letter and row number. Cell "B3," for instance, is in column B and row 3. Numerical and textual data are entered into the cells of the spreadsheet according to the organization imposed by the author. The cells can be formatted to present the numbers and text in a desired appearance.

Conventional spreadsheets also permit an author to define mathematical functions within individual cells. The functions are set apart from normal data by use of a leading descriptor entry, such as an "=" sign. It is common for the mathematical functions entered in one cell to use data contained in other cells. The function itself is not displayed in the cell; rather, the cell displays the results of the function.

Depending on the program, a single spreadsheet can contain anywhere from thousands to millions of cells. Some spreadsheet programs can also link one spreadsheet to another that contains related information, and can update data in linked spreadsheets automatically. Spreadsheet programs may also include s programming or "macro" facilities, and some can be used for creating and sorting databases. For printed output, spreadsheet programs usually provide graphing capabilities and a variety of formatting options for both printed pages and text, numeric values, and captions and legends in graphs.

Microsoft Excel®, distributed by Microsoft Corporation of Redmond, Wash., is an example of a popular spreadsheet program that is widely available.

A spreadsheet is a very convenient way to implement a form, which is used repeatedly to enter different sets of data. In practice, a user typically creates an instance of a spreadsheet form that mimics a paper form. The spreadsheet contains fixed data and formulas, as well as variable data that changes with each data set. To create additional data sets, the user opens an existing instance of the form, changes the variable data, and saves the modified spreadsheet under a new filename.

A common user mistake is to open an existing instance of a spreadsheet form, change the data, and then save the instance without renaming the spreadsheet—thus overwriting and losing the original data. Such a mistake can be avoided by using the template feature of Microsoft Excel®.

A spreadsheet template in Excel® is like any other spreadsheet except that it is stored in a special location and protected from overwriting. Before saving a spreadsheet that is based a template, Excel® prompts the user for a new filename.

A template can be used to define a spreadsheet form. When a user wants to enter new data, he or she opens the template (using the "File:New" command in Excel®, resulting in a new instance of the spreadsheet form. The user enters the appropriate data, and saves the spreadsheet form (using the "File:Save" command in Excel®). Before actually saving the spreadsheet, the spreadsheet program asks the user for a filename. The spreadsheet is then saved under this filename.

Even with the convenience of the template feature, the use of spreadsheet forms as described above results in many unique instances of the form, each with a different set of data. There is no easy way to combine and analyze the data from the different form instances, and it is often difficult to locate any particular form instance containing a desired set of data.

SUMMARY OF THE INVENTION

The inventors have devised a way to set up spreadsheet forms so that data entered into different form instances is automatically stored in a single database. One advantage of this is that the data can then be accessed, analyzed, and possibly modified using traditional database methods.

In addition, the inventors have implemented a process within a spreadsheet program that automatically sets up a system to integrate data from different instances of a spreadsheet form into a unified database. The process is implemented as a helper function or "wizard." It prompts a user to identify an existing instance of a spreadsheet form and a new or existing database. It then asks the user to specify correspondences between spreadsheet cells and database record fields.

Once this information is obtained from the user, the helper function creates a template based on the identified form instance, and attaches executable code to the template. The code, in the form of a macro, is set up to be executed whenever the template is saved as a specific instance of a spreadsheet form. Before actually saving the form instance, the executable code saves data from cells in the form instance to corresponding fields in the identified database.

Each form instance is associated with a particular record of the database, and the data from a particular form instance is saved in the fields of the corresponding database record. To maintain a correlation between form instances and database records, a key value is assigned to each form instance. The key value is saved in the database along with the data of a particular form instance. Before saving a particular form instance, the attached code determines whether the form instance is already associated with an existing record in the database. If there is already such an association, the user is asked whether he or she wishes to create a new record. If the user does not wish to create a new record, existing record is overwritten with the data from the form instance. If there is no existing association, or if the user wishes to create a new record in spite of an existing association, a new record is created, and the form instance data is written to the new record.

BRIEF DESCRIPTION OF THE DRAWINGS

FIG. 3 is a diagrammatic representation of a spreadsheet form in accordance with the invention.

FIG. 4 is a template wizard dialog box.

FIG. 10 is a block diagram of a database created in accordance with the invention.

FIGS. 11 and 12 are flow charts showing preferred methodological steps in accordance with the invention.

DETAILED DESCRIPTION OF THE PREFERRED EMBODIMENT

Figure 1:
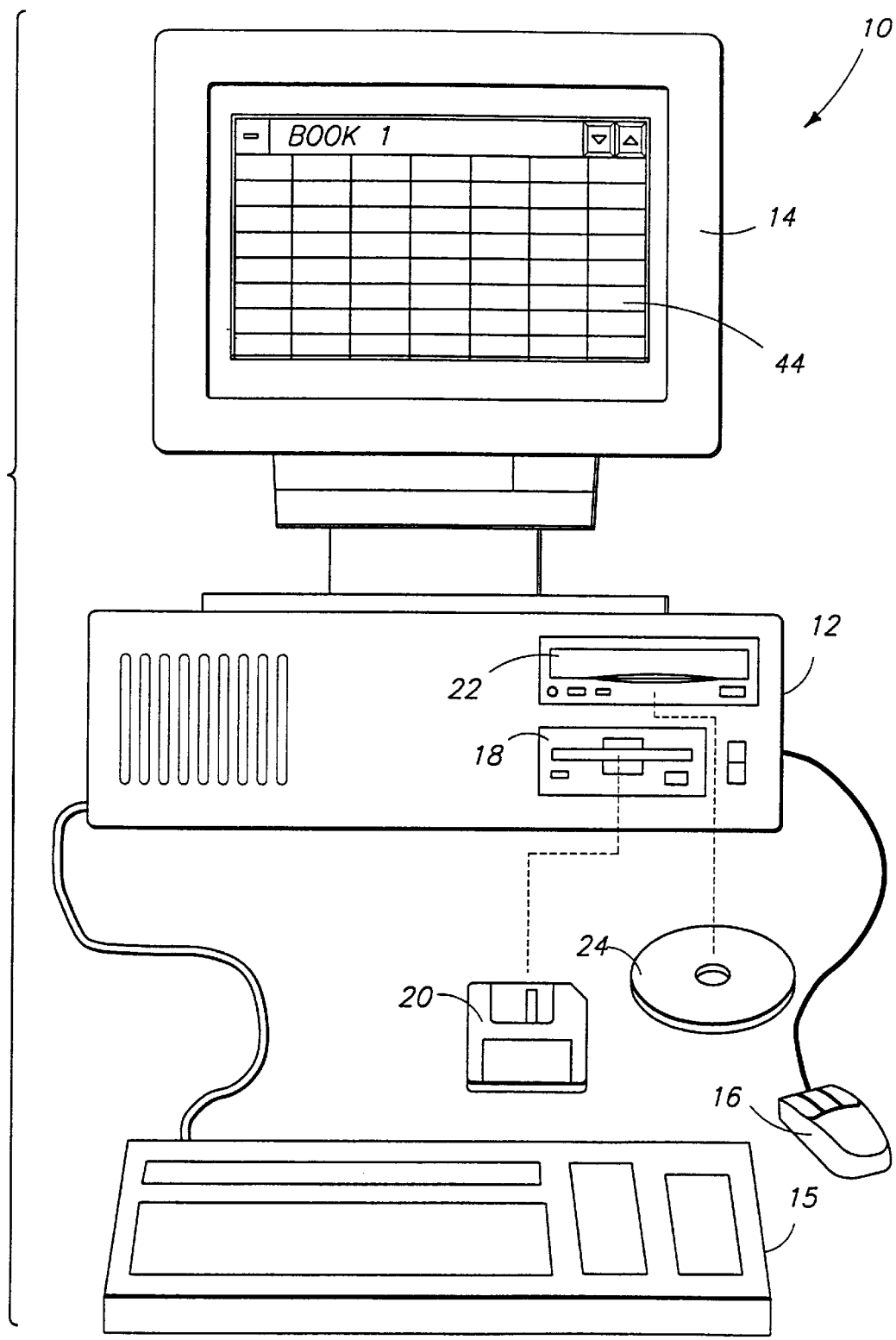
FIG. 1 is a diagrammatic representation of a computer used in conjunction with the preferred embodiment of the invention.

FIG. 1 shows a computer 10 in the form of a conventional desktop IBM-compatible computer. The computer 10 has a central processing unit (CPU) 12, a display monitor 14, a keyboard 15, and a mouse 16. The computer 10 also has a floppy disk drive 18 for interfacing with a compatible floppy memory diskette 20 (e.g., 3.5" form factor), and an optical disk drive 22 for interfacing with a compatible CD-ROM 24. The computer 10 might also include another input device in addition to, or in lieu of, the keyboard 15 and mouse 16 including such devices as a track ball, stylus, or the like.

Figure 2:
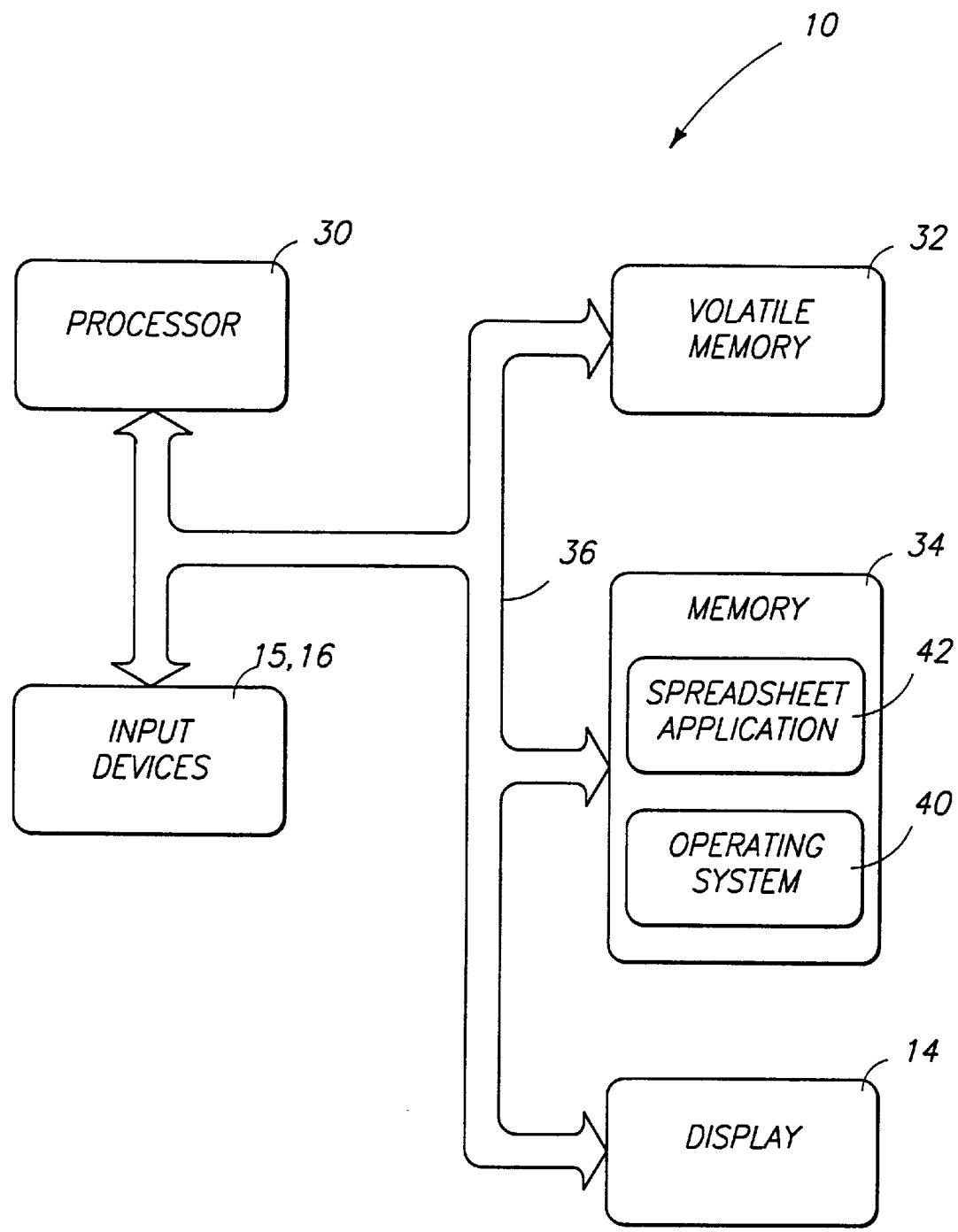
FIG. 2 is a block diagram of the computer of FIG. 1.

FIG. 2 shows a functional block diagram of the computer 10. The computer 10 has a processor 30 and computer-readable storage media including volatile memory 32 (e.g., RAM) and non-volatile memory 34. The components are interconnected by an internal bus 36. Non-volatile memory 34 can be implemented as integrated circuit chips (e.g., ROM, EEPROM), disk drive(s) (e.g., floppy, optical, hard), or a combination of both. Display 14 is connected to bus 36 through appropriate hardware interface drivers (not shown). Additionally, input devices 15 and 16 are connected to supply data to bus 36 via appropriate I/O ports, such as serial RS-232 ports.

Computer 10 runs an operating system 40 which supports multiple applications. Operating system 40 is stored in non-volatile memory 34 and executed on processor 30. The operating system is preferably a multitasking operating system which allows simultaneous execution of multiple applications, although aspects of this invention may be implemented using a single-tasking operating system. The operating system preferably employs a graphical user interface windowing environment which presents the applications or documents in specially delineated areas of the display screen called "windows." Each window has its own adjustable boundaries which enable the user to enlarge or shrink the application or document relative to the display screen. Each window can act independently, optionally including its own menu, toolbar, pointers, and other controls, as if it were a virtual display device. One preferred operating system is the Windows® operating system sold by Microsoft Corporation, such as Windows® 95 or Windows NT™ or other derivative versions of Windows®. However, other operating systems which provide windowing environments may be employed, such as the Macintosh Finder from Apple Corporation and the OS/2 Presentation Manager from IBM.

A computerized spreadsheet program 42 is stored in the non-volatile memory 34. When activated, the spreadsheet program 42 runs under operating system 40 while executing on processor 30. As one example, the spreadsheet program 42 is a program manufactured and sold under the name Excel by Microsoft Corporation. The spreadsheet application 42 can be loaded into the memory 34 from the floppy diskette 20 or CD-ROM 24, or alternatively, downloaded from a network via a network port (not shown).

It is noted that the invention is described within the illustrated context of a familiar desktop computer, as shown in FIG. 1. An example computer includes a 386-equivalent microprocessor, or better, with four to eight megabytes of RAM. This example computer is capable of running a multitasking operating system with a windowing environment. However, aspects of this invention might also be employed in other forms of computing devices, such as laptop computers, hand-held computers, portable personal information managers (PIMs), and the like. In these devices, the spreadsheet application may be configured to run on a single-tasking operating system which does not support a windowing environment.

With reference again to FIG. 1, a user launches the spreadsheet program in a customary fashion by, for example, clicking on an icon or choosing the program from a menu. The graphical user interface of the spreadsheet application is displayed on the monitor 14 and bounded within a window 44, as is customary in a graphical user interface windowing environment. The window 44 is associated with the spreadsheet application, and is referred to as the "spreadsheet window."

Figure 3:
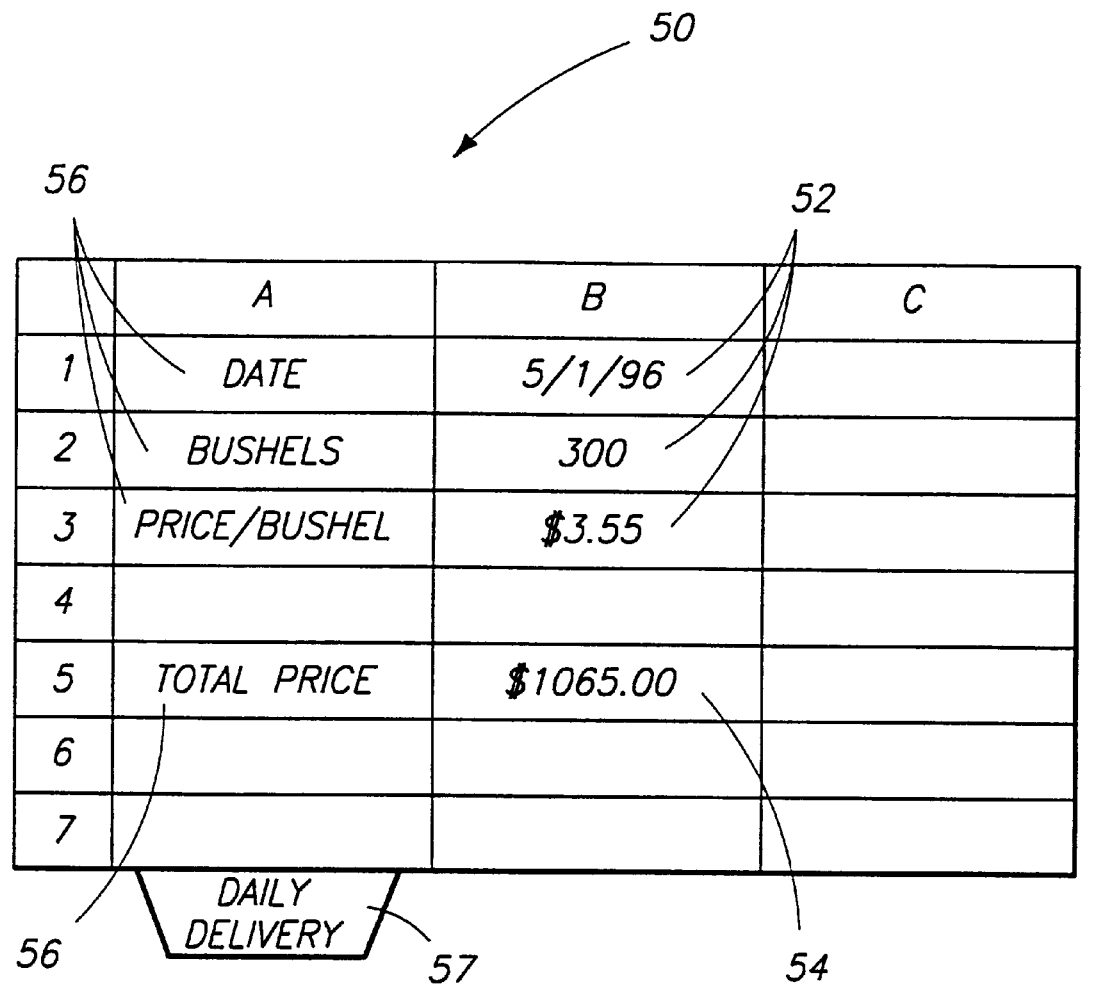

FIG. 3 shows an instance 50 of a simple exemplary spreadsheet form as displayed by spreadsheet program 42. In this discussion, the term "spreadsheet form" refers to an abstract spreadsheet organization defining fixed data, formulas, and variable data-entry cells for user-provided and calculated data. An "instance" of a spreadsheet form is an actual spreadsheet or worksheet based on the spreadsheet form. There can be many instances of the same spreadsheet form, each instance having the same fixed data and formulas, but different user-provided data. Each instance is saved individually as a spreadsheet file in non-volatile memory 34.

In accordance with a conventional spreadsheet layout, form instance 50 includes multiple rows and columns of individual cells, labeled by numbers and columns, respectively. Some cells contain fixed data or formulas that remain unchanged from instance to instance of the form. Other cells, referred to as data-entry cells, contain variable data that is entered by a user for each form instance. In this case, the form is a receipt that indicates the number of bushels of grain delivered and sold to a grain elevator in a single day. It includes data-entry cells 52 for the date, number of bushels, and price-per-bushel. Another data-entry cell 54 is associated with a formula that calculates and displays the total price of the delivered grain, based on the number of bushels and the price-per-bushel. Fixed-data cells 56 contain textual labels corresponding to the data-entry cells. The overall organization of the spreadsheet, its fixed data, and its formulas remain constant from one instance of the form to another. The data contained in the data-entry cells changes as the user enters different data for each delivery day. Label 57 indicates the name of the worksheet, in this case "DAILY DELIVERY."

In the preferred embodiment of the invention, spreadsheet program 42 includes a helper function that is invoked from within spreadsheet program 42. In the Excel® spreadsheet program, such a function is referred to as a "wizard," and in this case the function is referred to as a "template wizard." The template wizard is implemented as an "add-in application" in Microsoft Excel®. An add-in application is a supplemental program that adds custom commands and features to Microsoft Excel®. More specifically, an add-in application is a spreadsheet or workbook containing executable code and functions, saved in a special add-in format. Add-ins are an easy way to distribute macros, user-defined functions, or complex macro applications to users. For more information about how to create, transport, and use add-in applications, see the "Microsoft Excel/Visual Basic for Windows 95 Programmer's Guide," available from Microsoft Corporation, hereby incorporated by reference.

The purpose of the template wizard is to automatically set up a spreadsheet template upon which multiple instances of a particular spreadsheet form can be based. The wizard sets up a correspondence between the spreadsheet form and a database, wherein each instance of the form is associated with a different record of the database. When a new form instance is saved, a corresponding record in the database is created to contain the variable data of the new instance. When a form instance is re-saved, the user is given two options: (a) to save the variable data in the original database record, in which case a new record is not created, or (b) to save the variable data in a new record.

FIG. 4 shows a first dialog box 100 that is displayed to a user upon invoking the template wizard. The template wizard assumes that the user has already opened an existing file containing one or more spreadsheets or worksheets. The template wizard is initiated by selecting "template Wizard" from the "Data" menu in Excel®.

Dialog box 100 contains illustrations and explanatory text for a user. It also contains an input field prompting the user to identify an existing spreadsheet. This input field is implemented as a drop-down combo box 102, which allows the user to select from any of the spreadsheets in the currently open file. In this case, the user has selected a spreadsheet entitled "DAILY DELIVERY."

Dialog box 102 also includes an input field 104 prompting the user for a filename to be used for a template that will be created in subsequent steps.

Figure 5:
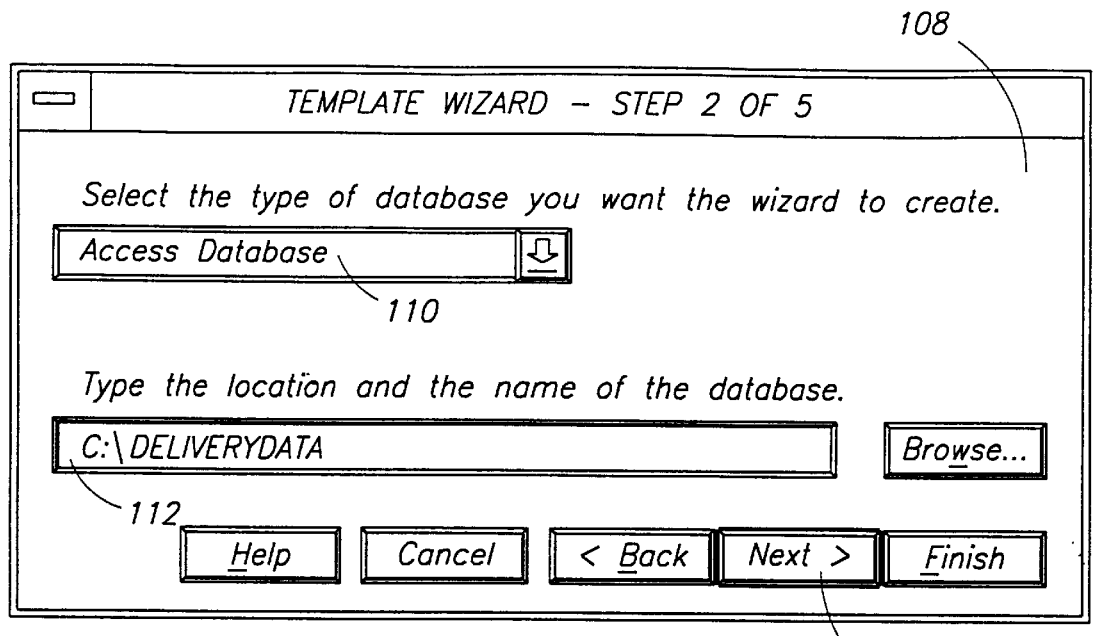
FIGS. 5–9 are representations of user interface displays utilized in the preferred embodiment of the invention.

After entering the data requested in dialog box 102, the user clicks on a "NEXT" button 106 to move to a second dialog box 108, shown in FIG. 5. This dialog box includes input fields prompting the user to identify a database. These input fields include a drop-down combo box control 110 allowing the user to specify a database type or format. Possible choices include various different brands of database programs, such as Microsoft Access®. The user can also choose to set up a database in a spreadsheet format, such as Microsoft Excel format. A spreadsheet-implemented database has multiple records defined by rows of spreadsheet cells. Fields within the records are defined by spreadsheet columns.

Dialog box 108 also contains a text box 112, prompting the user for the filename of the database which is to be used for storing entered data. The user may specify a new database or an existing database.

Figure 6:
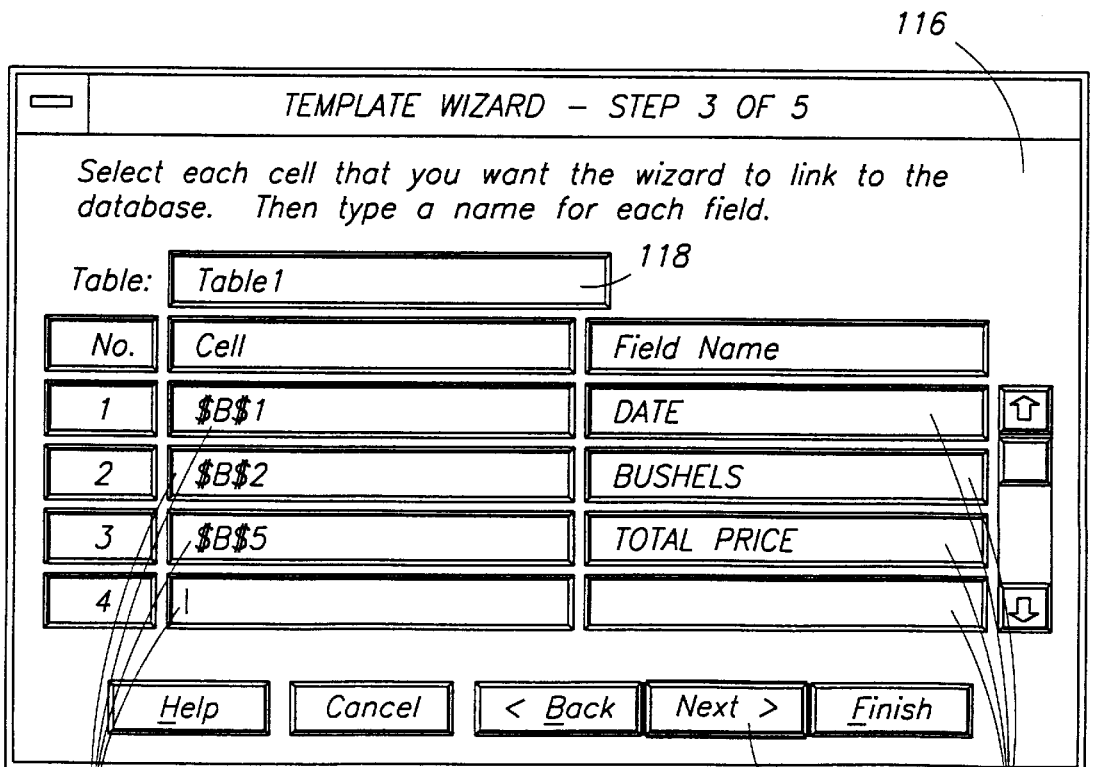

After entering the data requested in dialog box 108, the user clicks on a "NEXT" button 114 to move to a third dialog box 116, shown in FIG. 6. In this dialog box, the template wizard prompts the user to identify correspondences between data-entry cells of the identified spreadsheet and record fields of the identified database. A text box 118 allows the user to specify a specific table of the database to be used for storing data. A first column of text boxes 120 corresponds to different spreadsheet cells. A second column of text boxes 122 corresponds to different database fields. The user is responsible for identifying, in each row, a cell having variable data which is to be saved and a corresponding database field in which the data is to be saved.

In this case, the user has set up three correspondences. In row one of dialog box 116, the user has specified that cell B1 of the spreadsheet, containing the date, corresponds to a field named "date" in the database. In row two, the user has specified that cell B2 of the spreadsheet, containing the number of bushels, corresponds to a field named "bushels" in the database. In row three, the user has specified that cell B5 of the spreadsheet, containing the total price of the delivered grain, corresponds to a field named "total price" in the database.

The template wizard is programmed to database field names in certain situations. Specifically, if the user has specified a database that does not yet exist, the template wizard proposes a database field name to correspond with a particular cell based on the label associated with the particular cell in the spreadsheet. The template wizard determines whether a label is associated with the particular cell by examining the neighboring cells immediately to the left and immediately above the particular cell.

Advanced features of Microsoft Excel® are used throughout the template wizard. For instance, the user can specify a cell by simply clicking on the actual cell itself after positioning the cursor in the desired text box of dialog box 116. In the preferred embodiment of the invention, the template wizard proposes a database field name in a particular row of dialog box 116 only after the user has specified a spreadsheet cell in the first column of the row.

Figure 7:
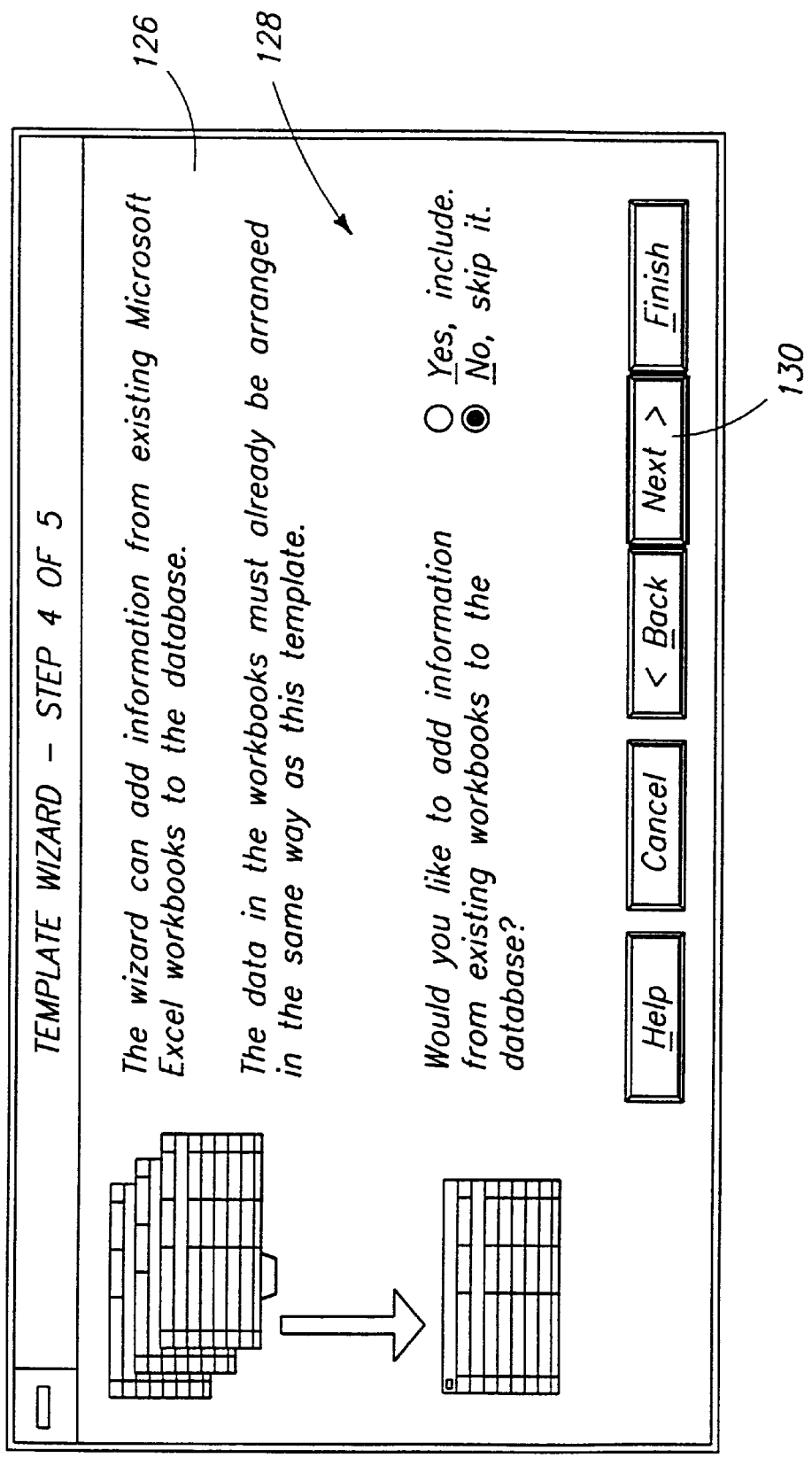

After entering the data requested in dialog box 116, the user clicks on a "NEXT" button 124 to move to a third dialog box 126, shown in FIG. 7. This dialog box asks the user whether there are existing form instances having data that should be added to the database. An option group 128 is presented, allowing the user to select either "yes" or "no." The user clicks "NEXT" button 130 to proceed to the next dialog box.

Figure 8:
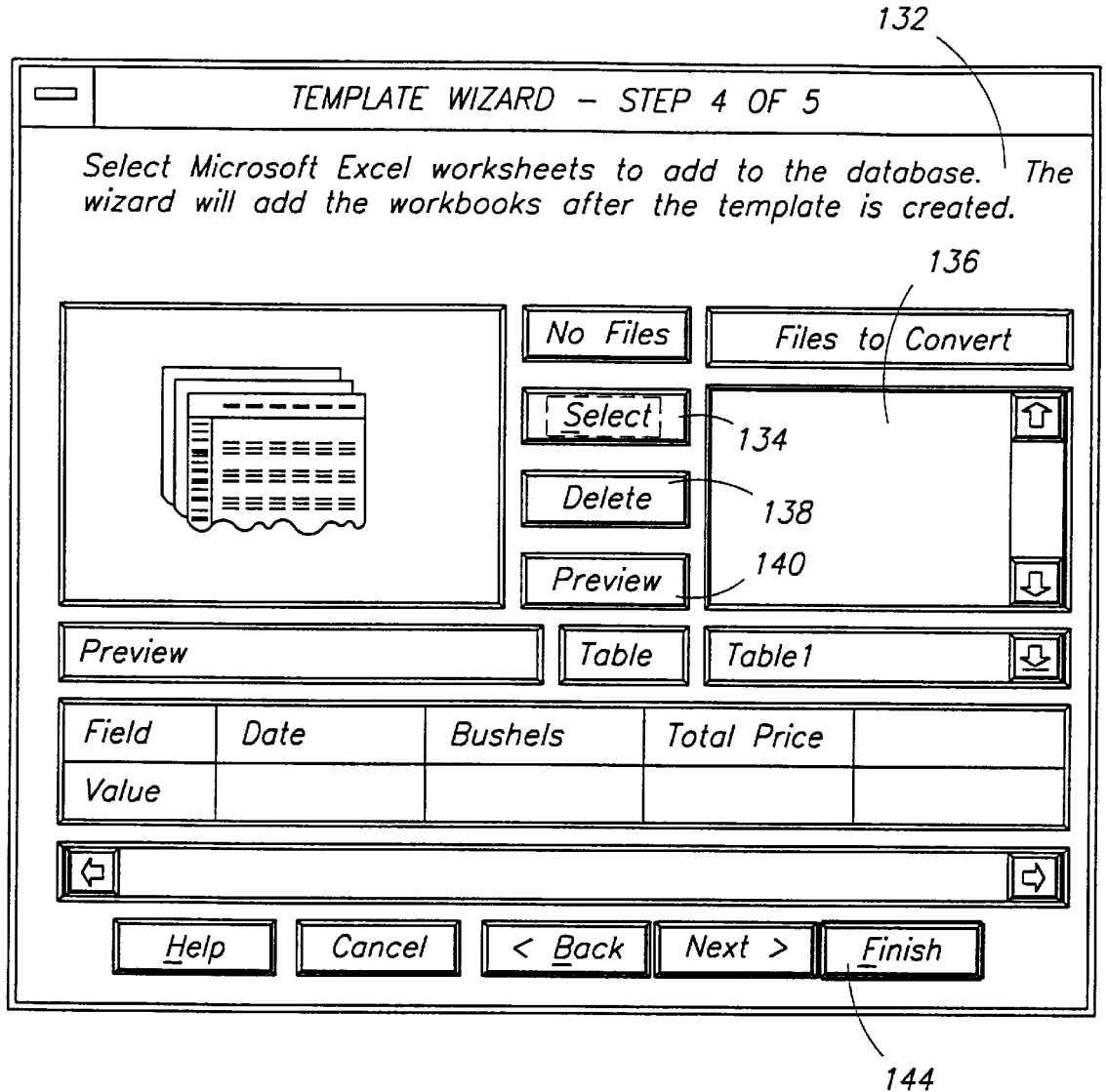

Dialog box 132, FIG. 8, is displayed only if the user selects "yes" from dialog box 128. Dialog box 132 prompts the user to identify existing spreadsheets, thereby allowing the user to specify additional files containing form instances that should be saved to the database that has been identified in dialog box 108. Clicking "SELECT" button 134 opens a conventional file management window, allowing the user to browse a file system and to select any particular file. Once a file is selected, it is listed in list box 136. Files can be removed from list box 136 by highlighting them and clicking "DELETE" button 138. Clicking "PREVIEW" button 140 allows the user to preview the identified existing spreadsheets to verify that they are instances of the identified spreadsheet form. Dialog box 132 has a preview table 142 in which data from the highlighted spreadsheet is shown. The first row of the table shows the database field names that were identified in dialog box 116. The second row shows corresponding values that will be copied to those database fields from the highlighted spreadsheet.

Figure 9:
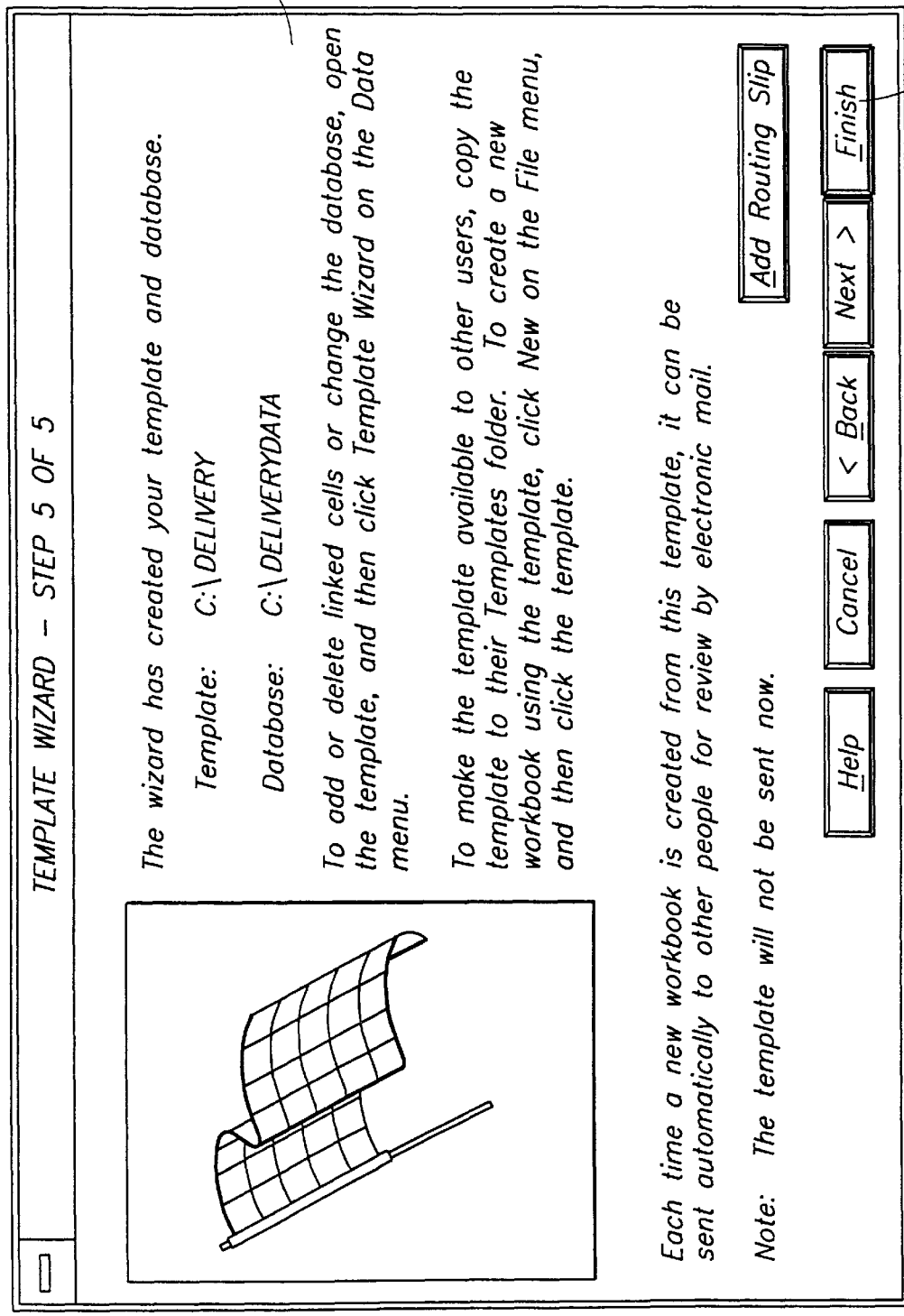

When all existing additional spreadsheet file have been specified, the user clicks "FINISH" button 144 to end the process. A final explanatory dialog box 148, FIG. 9, is displayed, giving the user the option of sharing the results of the process with other users.

When "FINISH" button 150 of dialog box 148 is clicked, the template wizard creates a template based upon the form instance specified in dialog box 100. The template is used to create multiple form instances, each with its own data. Code and executable cross-reference information is associated with the template and with each form instance based on the template, to implement the correspondence between each instance and a record of the identified database, and between cells of the form instance and different record fields of the database. Whenever a form instance based on the template is saved, its data is also saved to the database.

Figures 10, 11:
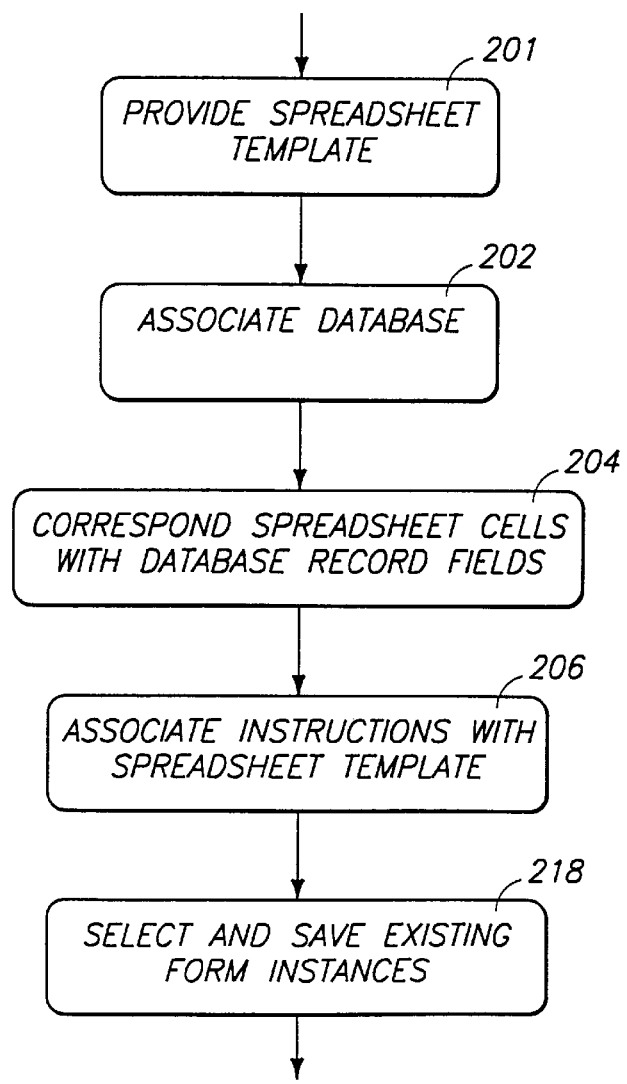

FIG. 10 shows a database table 200 such as might be created by the template wizard in response to the example shown by the preceding figures. The table contains a column for each of the three fields identified by the user in dialog box 116. There is a row for every instance of a form (five rows are shown, corresponding to five form instances). In the example shown, the first row of the table corresponds to the form instance of FIG. 3. In accordance with the correspondences set up in dialog box 116, the data from cell B1 is saved in the column of table 200 labeled "DATE"; The data from cell B2 is saved in the column of table 200 labeled "BUSHELS"; and the spreadsheet cell containing the data from cell B5 is saved in the column of table 200 labeled "TOTAL PRICE".

Database table 200 also includes a column entitled "KEY". This column contains identifiers for the associated spreadsheet form instances, allowing a one-to-one correspondence to be maintained between form instances and database records. This will be explained in more detail below.

FIG. 11 shows methodical steps of entering and saving data using a spreadsheet program. A step 201 comprises providing or creating a spreadsheet template that defines a spreadsheet form. In the embodiment described above, this step is accomplished by converting an existing instance of a spreadsheet form to a template. In Excel®, converting a spreadsheet to a template requires selecting "Save As" from the "File" menu and selecting "Template" from the "File Type" drop-down box in the "Save As" dialog box.

A step 202, performed in the preferred embodiment by the helper function or wizard described above in conjunction with operator input, comprises associating the template with a specific database. Related step 204 comprises creating or identifying correspondences between individual data-entry fields of the spreadsheet form and individual record fields of the database. Specifically, the file specification of the database that is to be associated with the template is recorded in a hidden worksheet in the template. In addition, this hidden worksheet contains a spreadsheet/database cross-reference, indicating the correspondence between the data-entry cells of the spreadsheet form and the record fields of database records.

Step 206 comprises associating instructions with the spreadsheet template, executable when a user saves an instance of the spreadsheet form, to save the variable data from the data-entry cells of the form instance in corresponding record fields of associated database records. These instructions are referred to as "auto template" instructions. In the preferred embodiment, the auto template instructions become associated with each instance of the form that is based on the spreadsheet template. The instructions are written in a programming language that the spreadsheet program can interpret. In Excel®, the instructions are attached to the spreadsheet template as an "auto_open" macro, contained in a hidden macro sheet. The macro is preferably kept to a minimum size, and contains calls or "hooks" to more extensive procedures implemented as part of an Excel® add-in application as discussed above. The add-in procedures are written in the Microsoft Visual Basic® programming system. The instructions are written to implement the steps described herein, using the features of Microsoft Excel® and Microsoft Visual Basic®.

A further step 218 comprises selecting a plurality of existing form instances, and saving the variable data from these instances in the database. This step is explained above with reference to FIG. 8.

Referring now to FIG. 12, a step 220 comprises creating multiple instances of the spreadsheet form defined by the spreadsheet template. Creating an instance of the form is accomplished by selecting the template. Each time the template is selected, a new instance of the form is created in computer memory. Each instance includes the hidden worksheet identifying the database with which the form instances are to be associated. This hidden worksheet also contains the spreadsheet/database cross-reference. Each instance of the form also includes the hidden macro sheet containing the auto template instructions.

Step 222 comprises saving a particular form instance as a spreadsheet using the spreadsheet program. This step is initiated by a user, when the user commands the spreadsheet program to save the particular form instance that the user has created. In response to this step, the auto template instructions are initiated as indicated by block 224 of FIG. 12.

The auto template instructions save the variable data from the form instance in the database associated with the form instance. First, the instructions perform a step of associating the form instance with a particular record of the database. Each form instance is associated with a different database record, and each record has record fields corresponding to the data-entry cells of the form instances.

To maintain a one-to-one relationship between form instances and databases records, the auto template instructions perform associate a unique key value to each form instance. In the present embodiment of the invention, this key value is a number produced from a random number generator. The key value is saved in the database as shown in FIG. 10, to identify the form instance associated with each record.

Before saving data from a form instance to the database, the auto template instructions perform a step 226 of using the key value of the form instance to determine whether there is an existing database record that is already associated with the particular form instance. This is done by comparing the key value of the form instance with the key values already stored in the database. If there is already such an existing database record, a step 228 is performed of asking the user whether he or she desires to create a new record. If the user does not wish to create a new record, a step 230 is performed of overwriting the existing database record with new variable data from the form instance. If step 226 determines that there is no existing database record that is already associated with the form instance, or if the user indicates in step 228 that a new record is to be created, a step 232 is performed of assigning a new key value to the form instance. The new key value is determined by sampling the output of a random number generator until obtaining a key value that has not yet been used in the database. After step 232, a step 234 is performed of creating a new database record and writing the variable data from the form instance to the newly-created database record.

Once these steps have been performed, the spreadsheet data can be read from the database and modified with a conventional database program or front-end.

The invention provides a very easy way for a user to set up and maintain a database that is derived from spreadsheet forms. It does this without forcing the user to change his or her current practices—the user can continue to use spreadsheet forms. However, the invention allows the data from such spreadsheet forms to be integrated in a single file or database, for central access by the user or other users. Data from multiple users can even be integrated into a single database by basing all form instances on the same, automatically created spreadsheet template.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A spreadsheet data file saved on a computer-readable storage medium by and apart from a spreadsheet program, comprising:

variable spreadsheet data that has been entered by a user;

instructions saved with the variable spreadsheet data, the instructions being executable by the spreadsheet program when saving the spreadsheet data file to perform a step of saving the variable spreadsheet data in a separate database apart from the spreadsheet data file.

2. A spreadsheet data file as recited in claim 1, wherein the instructions perform the following additional steps when executed by the spreadsheet program:

determining whether the variable spreadsheet data has already been saved to an existing record in the database;

if the variable spreadsheet data has not already been saved to a record in the database, creating a record in the database and saving the variable spreadsheet data to the created record in the database.

3. A spreadsheet data file as recited in claim 1, further comprising:

a file specification of said database where the variable spreadsheet data is to be saved.

4. A spreadsheet data file as recited in claim 1, further comprising:

a cross-reference between data-entry cells of the variable spreadsheet data and record fields of the database.

* * * * *